June 3, 1969    I. M. GELFAND ET AL    3,447,364
APPARATUS FOR AUTOMATIC TESTING OF WIRE STRENGTH DURING DRAWING
Filed April 7, 1966
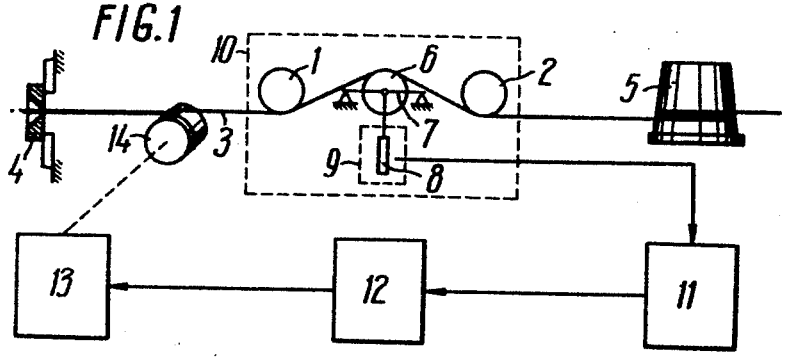
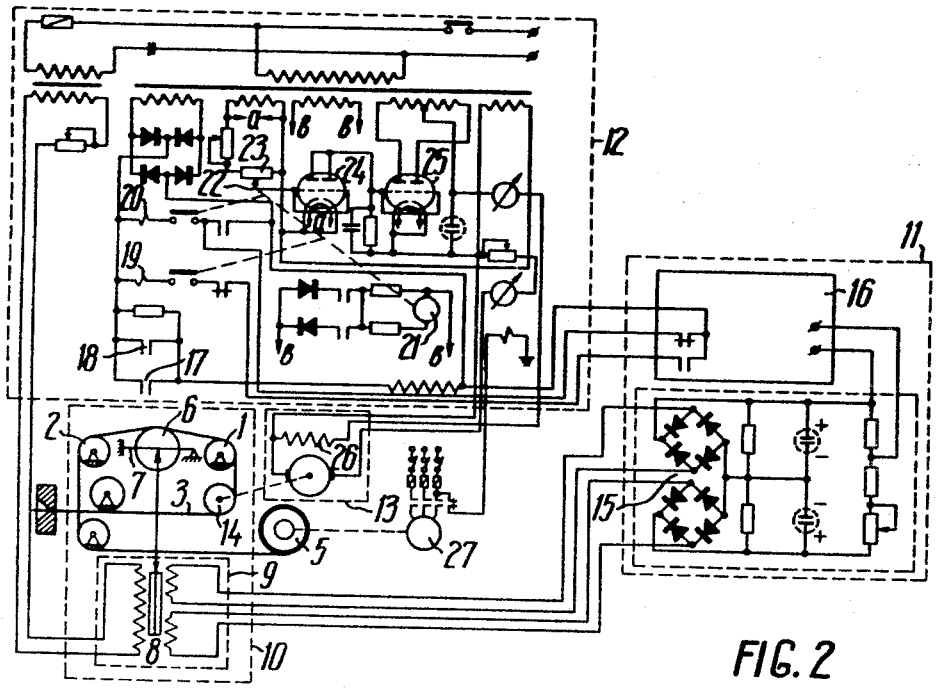

United States Patent Office 3,447,364
Patented June 3, 1969

3,447,364
APPARATUS FOR AUTOMATIC TESTING OF WIRE STRENGTH DURING DRAWING
Ilya Markovich Gelfand, pr. Lenina, 10, kv. 23; Nikolai Ivanovich Zavalischin, ul. Kirova, 196, kv. 14; and Gennady Petrovich Kulachenkov, ul. Mira, 12/2, kv. 7, all of Magnitogorski, U.S.S.R.
Filed Apr. 7, 1966, Ser. No. 540,927
Int. Cl. G01n 3/28
U.S. Cl. 73—95.5                                    1 Claim

ABSTRACT OF THE DISCLOSURE

Apparatus for testing wire strength during drawing of the wire including a transducer which senses variation in wire tension and controls a drag generator which acts on a drag roller to vary the braking effort on the wire in order to insure uniform wire tension.

---

This invention relates to devices for strength testing of filamentary materials, and more particularly, to apparatus for strength testing of very fine bimetallic wire during the drawing process.

Now in use are devices incorporating tensiometers and utilized for tensile tests of wire samples or samples of any other filamentary materials.

The above mentioned devices, however, are applicable mostly when investigating strength characteristics of samples being tested, and fail to provide for continuous check-up of products under shop conditions.

There have been proposed devices for measuring the wire or thread tension while rewinding these on reels, which are connected to electrically-operated (e.g. inductance-type) transducers which, in turn, are coupled to an indicator means.

The function of the above-said devices is restricted to passive registration of the tension of the material being rewound.

According to the above, this invention has for its object to provide an apparatus for wire strength testing which will exclude automatically during drawing the production of wire with a tensile strength below that specified.

A particular object of the invention is to provide an automatic tester capable of maintaining constant tension of the wire being drawn.

According to the present invention and in accomplishment of aforesaid and other objects thereof, provision is made for an apparatus which incorporates a tension transducer to whose output an actuator means is connected, sensitive to signals sent by the transducer. The actuator means, in turn, carries a movable tensioning element which is in close frictional engagement with the finally finished section of the wire near the said tension transducer during the drawing process, said tensioning element serving for restoring the test effort applied to the wire so as to suit the preset one by varying the conditions of mechanical interaction between the tensioning element and the wire under the action of the actuator means.

The actuator means is preferably an electric generator whose exciting winding is connected to the output of the tension transducer, whereas a rotatable roller rigidly fitted on the generator shaft serves as a tensioning element, said roller being capable of imparting rotary motion to the generator shaft during wire movement and varying the wire tension to attain a preset value thereof so as to suit the variation in the generator torque due to signals sent by the tension transducer.

A variable resistor adjustable by the transducer signals is preferably incorporated in the output circuit of the tension transducer before the generator, said resistor being coupled to the input of an electronic amplifier whose output is connected to the exciting winding of the above-said generator.

A specific and preferred embodiment of the present invention is described hereinafter, with reference to the accompanying drawings, wherein:

FIG. 1 is a block diagram of the apparatus for the automatic strength test of wire during drawing; and FIG. 2 is an elementary diagram of the apparatus shown in FIG. 1.

According to the invention, the apparatus comprises backup rollers 1 and 2 (FIGS. 1 and 2) positioned on the finally finished section of wire 3 drawn through an extreme finishing draw-die 4 and wound onto a rotatable drum 5.

Installed between backup rollers 1 and 2 is a movable roller 6 suspended by a flat spring 7 and directly contacting the wire 3 while in motion.

The movable roller 6 is mechanically coupled to a movable armature 8 of an induction-transforming converter 9 to form a wire tension transducer 10.

The transducer is connected via measuring unit 11 and amplifying unit 12 to an electric generator 13 onto the shaft of which a tensioning or drag roller 14 is rigidly fitted, said roller being tightly wound with the wire 3.

The measuring unit 11 incorporates a full-wave rectifier 15 (FIG. 2) connected to the input of an electronic potentiometer 16.

The amplifying unit 12 is provided with relays 19 and 20 whose respective normally open contacts 17 and 18 are connected to the output of the potentiometer 16, both relays serving the purpose of controlling a reversible motor 21.

The motor 21 is kinematically coupled with a slider 22 of a variable resistor 23 incorporated in the circuit of valves 24 and 25 at the amplifier input. An exciting winding 26 of electric generator 13 serves as a load for the output stage of the valve amplifier.

In the process of drawing, the drum 5 is imparted with rotary motion by a motor 27 whereby a certain tensioning effort is applied to wire 3; this effort must be equal to the preset test effort.

The wire section possessing reduced strength will not resist the preset force, and the wire will be broken at that very point of reduced strength. This will exclude the possibility of supplying non-quality wire to the customer.

Any variation in the test effort applied to the wire 3 will cause the roller 6 along with the armature 8 to move, which, in turn, will cause the signals produced by the converter 9 to be sent to the measuring unit 11.

Depending upon whether the test effort is above or below the preset value, one of the contacts 17 and 18 is closed, whereupon the respective relay 19 or 20 operates accordingly, thereby causing the reversible motor 21, which controls the variable resistor 23, to rotate in either direction.

As a result of variation in the value of the resistor 23, the output voltage of the amplifier unit 12 is changed accordingly; apart from this, the excitation of the generator 13 as well as its torque are likewise changed. Consequently, the mechanical interaction between the tensioning roller 14 and the wire 3 is varied until the preset test effort applied to the wire 3 is attained.

Though the present invention has been described with reference to the testing of fine bimetallic wire during drawing, it will be understood that the invention may be readily applied, without introducing any essential alteration in construction, for testing any other moving flexible linear materials, such as filaments, cord threads, fibres, etc.

What we claim is:

1. Apparatus for the automatic testing of the tensile strength of wire which is drawn through a drawing device, said apparatus comprising motor driven reel means for drawing wire from a drawing device at a given tensile value, a drag roller between the reel and the drawing device, the wire being in frictional engagement with the drag roller, transducer means positioned between the drag roller and the reel means, the transducer means being engaged with the wire for producing signals proportional to any value of deviation of the tension in the wire from the given value, and a drag generator coupled to said drag roller and the transducer means for varying the effort of the drag roller on the wire in correspondence with the signals produced by the transducer means to control the tension in the wire until it returns to said given value, said transducer means comprising a group of backup rollers for guiding the wire being drawn; a measuring roller which is positioned between two of the aforesaid backup rollers in direct contact with the wire and supported for linear movement in response to variation in the tension in the wire tension; an induction-transforming converter including a movable armature mechanically coupled with said measuring roller and capable of being moved therewith, as a result of which said converter produces electrical signals proportioned to the value of deviation of the tension in the wire compared to the given value; an electric motor connected to the output of the aforesaid converter; a variable resistor mechanically coupled to said motor and controlled thereby; an electronic amplifier having an input connected to said variable resistor; said drag generator having a rotor fitted onto the shaft thereof, and an exciting winding connected to the output of said amplifier; said drag roller being rigidly coupled to the rotatable shaft of said generator for undergoing free rotary motion during wire travel and for varying the wire tension to attain the given value thereof in accordance with the variation in the torque applied to the shaft of said generator due to amplified signals produced by said converter and impressed on said exciting winding of the generator.

References Cited

UNITED STATES PATENTS

| | | | |
|---|---|---|---|
| 3,344,661 | 10/1919 | Breuer | 73—95.5 |
| 1,987,670 | 1/1935 | Drake et al. | 318—6 X |
| 2,485,757 | 10/1949 | Michel | 318—6 X |
| 2,715,701 | 8/1955 | Moore et al. | 318—6 |
| 2,889,706 | 6/1959 | Huyser | 73—89 |
| 2,925,731 | 2/1960 | Cammack | 73—144 |
| 2,930,102 | 3/1960 | Hitchin et al. | 73—144 X |
| 3,322,315 | 5/1967 | Eberlin | 226—195 X |

FOREIGN PATENTS

| | | |
|---|---|---|
| 206,850 | 2/1909 | Germany. |
| 44,012 | 12/1960 | Poland. |
| 1,103,634 | 3/1961 | Germany. |

CHARLES A. REUHL, *Primary Examiner.*

U.S. Cl. X.R.

73—144